2,894,986

Patented July 14, 1959

2,894,986

DIPHENYL UREA DERIVATIVES

David J. Beaver, Richmond Heights, and Paul J. Stoffel, St. Louis, Mo., assignors to Monsanto Chemical Company, St. Louis, Mo., a corporation of Delaware No Drawing. Application July 23, 1956
Serial No. 599,334

9 Claims. (Cl. 260—553)

This invention relates to new and useful diphenyl urea derivatives, intermediates therefor, and to processes for making same.

The diphenyl urea derivatives of this invention may be represented by the structure

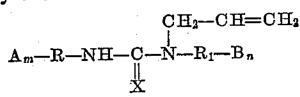

wherein X is sulfur or oxygen, wherein R and $R_1$, respectively, are phenyl, wherein A and B, respectively, are halogen, wherein $m$ and $n$, respectively, are integers from 1 to 3 inclusive, and wherein the sum of $m$ and $n$ is an integer from 3 to 6. By the term "halogen" as employed in the instant specification and appended claims is meant chlorine and bromine, but preferably chlorine. As illustrative of the diphenyl urea compounds falling within the scope of this invention is the following:

N-(3-chlorophenyl) N'-allyl N'-(3,4-dichlorophenyl) urea
N-(4-chlorophenyl N'-allyl N'-(3,4-dichlorophenyl) urea
N-(3,4-dichlorophenyl) N'-allyl N'-(3,4-dichlorophenyl) urea
N-(3,5-dichlorophenyl) N'-allyl N'-(3,4-dichlorophenyl) urea
N-(3,4,5-trichlorophenyl) N'-allyl N'-(3,4-dichlorophenyl urea
N-(3,4-dichlorophenyl) N'-allyl N'-(3-chlorophenyl) urea
N-(3,4-dichlorophenyl) N'-allyl N'-(4-chlorophenyl) urea
N-(3,4-dichlorophenyl) N'-allyl N'-(3,4-dibromophenyl) urea
N-(3,4-dibromophenyl) N'-allyl N'-(3,4-dibromophenyl) urea
N-(3,4-dichlorophenyl) N'-allyl N'-(3,4-dichlorophenyl) thiourea
N-(3,5-dichlorophenyl) N'-allyl N'-(3,4-dichlorophenyl) thiourea As illustrative of the preparation of the diphenyl urea derivatives of this invention is the following:

*Example A*

To a suitable reaction vessel equipped with a thermometer, agitator, and reflux condenser is added 162.1 parts by weight of 3,4-dichloroaniline. The mass is heated to about 75–80° C. and with agitation is added dropwise 38.2 parts by weight of allyl chloride. Upon completion of the allyl chloride addition the slurry so obtained is held at 80–85° C. for about 18 hours. The mass is then cooled to about room temperature and thereto is added with agitation aqueous sodium hydroxide containing 30 parts by weight of sodium hydroxide and 500 parts by weight of water. The oil phase is separated and extracted with several portions of diethyl ether. The extracts are combined, dried over calcium chloride and subjected to vacuum distillation to remove the diethyl ether and any unreacted amine. The resultant lemon yellow oil is N-allyl 3,4-dichloroaniline, which boils at 159–161° C. at 10.5 mm. of mercury pressure.

Employing the procedure of Example A but replacing 3,4-dichloroaniline with an equimolecular amount of 3-chloroaniline, 4-chloroaniline, 3,4-dibromoaniline, and 3,4,5-trichloroaniline, respectively, there is obtained N-allyl 3-chloroaniline, N-allyl 4-chloroaniline, N-allyl 3,4-dibromoaniline, and N-allyl 3,4,5-trichloroaniline. Instead of allyl chloride, allyl bromide may be employed in preparing the N-allyl chlor-substituted aniline.

*Example I*

To a suitable reaction vessel equipped with a thermometer, agitator, and reflux condenser and containing 20.2 parts by weight of N-allyl 3,4-dichloroaniline in approximately 100 parts by weight of diethyl ether is added dropwise a solution of 15.4 parts by weight of 4-chlorophenylisocyanate in approximately 25 parts by weight of diethyl ether at such a rate so as to maintain gentle reflux. Upon completion of the isocyanate addition the reaction mass is agitated for about 2 hours. The mass is filtered and the residue is recrystallized from 95% ethanol. The dried product is N-(4-chlorophenyl) N'-allyl N'-(3,4-dichlorophenyl) urea (colorless needles, M.P. 151.2–152.0° C.).

*Example II*

To a suitable reaction vessel equipped with a thermometer, agitator, and reflux condenser and containing 20.2 parts by weight of N-allyl 3,4-dichloroaniline in approximately 100 parts by weight of heptane is added dropwise a solution of 18.8 parts by weight of 3,4-dichlorophenylisocyanate in approximately 50 parts by weight of heptane at such a rate so as to maintain a temperature of 50–60° C. Upon completion of the isocyanate addition the reaction mass is agitated for about 2 hours. The mass is filtered and the residue washed with heptane and dried. The dried product is N-(3,4-dichlorophenyl) N'-allyl N'-(3,4-dichlorophenyl) urea (white granules, M.P. 116.8–117.5° C.).

*Example III*

To a suitable reaction vessel equipped with a thermometer, agitator, and reflux condenser is added 16.8 parts by weight of N-allyl 4-chloroaniline, 20.0 parts by weight of 3,4-dichlorophenylisothiocyanate and approximately 125 parts by weight of ethanol, and the mass is refluxed for two hours. The mass is cooled, filtered and the residue washed with ethanol and dried. The dried product is N-(3,4-dichlorophenyl) N'-allyl N'-(4-chlorophenyl) thiourea.

*Example IV*

To a suitable reaction vessel equipped with a thermometer, agitator, and reflux condenser and containing 16.8 parts by weight of N-allyl 3-chloroaniline in approximately 100 parts by weight of diethyl ether is added dropwise a solution of 18.8 parts by weight of 3,4-dihclorophenylisocyanate in approximately 25 parts by weight of heptane at such a rate so as to maintain gentle reflux. Upon completion of the isocyanate addition the reaction mass is agitated for about 2 hours. The mass is filtered and the residue washed with diethyl ether and dried. The dried product is N-(3,4-dichlorophenyl) N'-allyl N'-(3-chlorophenyl) urea.

*Example V*

To a suitable reaction vessel equipped with a thermometer, agitator, and reflux condenser and containing 23.7 parts by weight of N-allyl 3,4,5-trichloroaniline in approximately 100 parts by weight of diethyl ether is added dropwise a solution of 15.4 parts by weight of 4-chlorophenylisocyanate in approximately 25 parts by weight of heptane at such a rate so as to maintain gentle reflux. Upon completion of the isocyanate addition the reaction mass is agitated for about 2 hours. The mass is filtered and the residue washed with diethyl ether and dried. The dried product is N-(4-chlorophenyl) N'-allyl N'-(3,4,5-trichlorophenyl) urea.

*Example VI*

To a suitable reaction vessel equipped with a thermometer, agitator, and reflux condenser and containing 29.1 parts by weight of N-allyl 3,4-dibromoaniline in approximately 100 parts by weight of diethyl ether is added dropwise a solution of 19.8 parts by weight of 4-bromophenylisocyanate in approximately 25 parts by weight of heptane at such a rate so as to maintain gentle reflux. Upon completion of the isocyanate addition the reaction mass is agitated for about 2 hours. The mass is filtered and the residue washed with diethyl ether and dried. The dried product is N-(4-bromophenyl) N'-allyl N'-(3,4-dibromophenyl) urea.

In the preparation of the new compounds of this invention other inert solvents than heptane may be employed, e.g. di-isopropyl ether, methylbutyl ether, the liquid alkanes and the like. The reaction temperature employed in preparing the new compounds will depend upon the particular reactants and in general will be between room temperature and the reflux temperature of the system.

The compounds of this invention are particularly useful in controlling bacterial growth, particularly *Micrococcus pyogenes* var. *aureus*. In this regard the urea derivatives of this invention when compounded with a detergent soap (i.e. an alkali metal salt of a higher fatty acid of animal or vegetable origin, such as stearic acid, lauric acid, palmitic acid, oleic acid, linoleic acid, ricinoleic acid, and the like, or mixtures thereof obtained from tallow, lard, cocoanut oil, palm oil, castor oil, olive oil, cottonseed oil, and the like) provide highly useful antiseptic detergent soap compositions.

In order to illustrate the activity of the diphenyl urea derivatives of this invention several were incorporated in an alkali metal fatty acid soap, specifically an "Ivory" brand neutral high grade white toilet soap [a mixture of alkali metal salts of fatty acids whose fatty acid content analyzes

| | Percent |
|---|---|
| Oleic and linoleic acid | About 46 |
| Stearic acid | About 14 |
| Palmitic acid | About 30 |
| Lower fatty acids (myristic, lauric, etc.) | About 10] |

and contrasted to position isomers or analogues thereof. The respective compounds which are tabulated below were incorporated in the said "Ivory" brand toilet soap in a weight ratio of one part to 50 parts soap. Aliquots of each were added to a Sabourard's dextrose agar medium so as to give concentrations in parts per million as set forth below of the respective compounds in the agar. The agar in each case was then poured into a petri dish, allowed to harden and then inoculated with a standard culture of *Micrococcus pyogenes* var. *aureus* of standard resistance. The incubation in each instance was made at 37° C. for 48 hours. The extent of growth is noted below:

| Compound/concentration, p.p.m. | 100 | 10 | 1 |
|---|---|---|---|
| N-(3,4-dichlorophenyl) N'-allyl N'-isopropyl urea. | Heavy | Heavy | Heavy. |
| N-(3,4-dichlorophenyl) N',N'-diallyl urea. | do | do | Do. |
| N-(4-chlorophenyl) N'-allyl N'-(3,4-dichlorophenyl) urea. | None | None | None. |
| N-(3,4-dichlorophenyl) N'-allyl N'-(3,4-dichlorophenyl) urea. | do | do | Do. |

The same control of *Micrococcus pyogenes* var. *aureus* is obtained by replacing N-(4-chlorophenyl) N'-allyl N'-(3,4-dichlorophenyl) urea in the foregoing detergent soap compositions with an equal weight of N-(3,4-dichlorophenyl) N'-allyl N'-(3-chlorophenyl) urea, N-(3,4-dichlorophenyl) N'-allyl N'-(4-chlorophenyl) urea, N-(3,4,5-trichlorophenyl) N'-allyl N'-(3,4-dichlorophenyl) urea, and N-(3,5-dichlorophenyl) N'-allyl N'-(4-chlorophenyl) urea.

Replacing the foregoing "Ivory" brand soap with an equal weight of a "Lux" brand solid neutral white toilet soap (a mixture of alkali metal salts of fatty acids whose fatty acid content analyzes about 45% oleic and linoleic acid, about 30% palmitic acid, about 10% stearic acid, and about 15% lower fatty acids), the same results are obtained. The same results are also obtained using instead of a solid soap a liquid soap, such as that having a 40% alkali metal fatty acid soap content prepared from an alkali metal compound and a mixture of fatty acids obtained from a mixture of 75% cocoanut oil and 25% olive oil. Other alkali metal fatty acid soaps may also be used, e.g. the usual alkali metal (sodium and/or potassium) soaps of higher fatty acids of vegetable or animal origin, such as stearic, lauric, palmitic, oleic, linoleic, ricinoleic, and the like, or mixtures thereof obtained from tallow, lard, cocoanut oil, palm oil, castor oil, olive oil, hydrogenated cottonseed oil, and the like.

Relatively small amounts of these new diphenyl urea derivatives in a detergent soap composition have been found to yield effective antiseptic detergent soap compositions. Amounts as low as 0.5 to 1% by weight based on the weight of the detergent soap have proved satisfactory. However, it is preferred to employ these urea derivatives in amounts in the order of 1 to 5% by weight based on the detergent soap. While larger amounts, as for example up to 10% by weight, may be employed the upper limit will be determined by practical considerations. Various colors, antioxidants, perfumes, water softeners, emollients, and the like, may be included where desirable in detergent compositions containing these new diphenyl ureas. The term "soap" or "detergent soap" as used herein is employed in its popular or ordinary meaning, i.e., those cleansing compositions prepared from an alkali metal compound such as potassium or sodium hydroxide and a fat or fatty acid, both saturated and unsaturated.

While this invention has been described with respect to certain embodiments, it is not so limited and it is to be understood that variations and modifications thereof obvious to those skilled in the art may be made without departing from the spirit or scope of this invention.

What is claimed is:

1. Diphenyl ureas of the structure

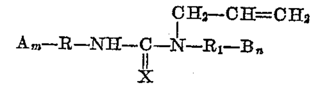

where X is selected from the group consisting of sulfur and oxygen, wherein R and $R_1$, respectively, are phenyl, wherein A and B, respectively, are halogen, wherein $m$ and $n$, respectively, are integers from 1 to 3, inclusive, wherein the sum of $m$ and $n$ is an integer from 3 to 6, inclusive, wherein the phenyl radicals R and $R_1$ are free of substituents ortho to the nitrogen atom, and wherein the halogen substituents A and B are selected from the group consisting of chlorine and bromine.

2. Diphenyl ureas of the structure

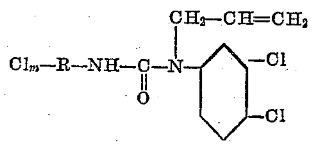

wherein $m$ is an integer from 1 to 3, inclusive, and wherein R is phenyl free of substituents ortho to the group —NH—.

3. N-(4-chlorophenyl) N'-allyl N'-(3, 4-dichlorophenyl) urea.

4. N-(3-chlorophenyl) N'-allyl N'-(3, 4-dichlorophenyl) urea.

5. N-(3, 4-dichlorophenyl) N'-allyl N'-(3, 4-dichlorophenyl) urea.

6. The process of making the compounds of claim 1, which comprises reacting a secondary amine of the structure $$B_n—R_1—NH—CH_2—CH{=}CH_2$$

wherein B is a halogen atom selected from the group consisting of bromine and chlorine, wherein $n$ is an integer from 1 to 3, and where $R_1$ is phenyl free of substituents ortho to the —NH— group with a substantially chemically equivalent amount of an isocyanate of the structure $$A_m—R—NCO$$

wherein A is a halogen atom selected from the group consisting of bromine and chlorine, wherein $m$ is an interger from 1 to 3, and wherein R is phenyl free of substituents ortho to the nitrogen atom, the sum of the intergers $m$ and $n$ being an integer from 3 to 6.

7. The process of making the compounds of claim 2, which comprises reacting N-allyl 3, 4-dichloroaniline with a substantially chemically equivalent amount of an isocyanate of the structure $$Cl_m—R—NCO$$

wherein $m$ is an integer from 1 to 3, and wherein R is phenyl free of substituents ortho to the nitrogen atom.

8. N-(4-bromophenyl) N'-allyl N'-(3, 4-dibromophenyl) urea.

9. N-(3-bromophenyl) N'-allyl N'-(3, 4-dichloro phenyl) urea.

References Cited in the file of this patent

UNITED STATES PATENTS

| | | |
|---|---|---|
| 2,535,077 | Kunz et al. | Dec. 26, 1950 |
| 2,607,779 | Towne et al. | Aug. 19, 1952 |
| 2,683,172 | Hill et al. | July 6, 1954 |
| 2,698,301 | Shumard | Dec. 28, 1954 |
| 2,723,192 | Todd | Nov. 8, 1955 |
| 2,745,874 | Schetty et al. | May 15, 1956 |